Patented Sept. 8, 1931

1,822,271

UNITED STATES PATENT OFFICE

GEORGE W. COGGESHALL, OF WASHINGTON, DISTRICT OF COLUMBIA

PROCESS OF RECOVERING OIL FROM OIL SANDS

No Drawing. Refiled for abandoned application Serial No. 53,442, filed August 29, 1925. This application filed January 21, 1931. Serial No. 510,331.

This invention relates to the recovery of hydrocarbon oils from oil sands, especially such as are depleted in the sense that the readily available oil has been removed by the usual pumping methods. It has been variously estimated that such depleted sands still retain more than fifty percent, and up to eighty or even ninety percent of the original oil; and many methods have been proposed in the past for the recovery of a part of this residual oil. Among such methods which have been tried on a considerable scale and with some measure of success are the use of air under pressure to cause a movement of the oil from adjacent areas to the operating well or wells; and the use of water, sometimes with mineral salt or alkaline additions, for the same purpose. Both of these methods have proven effective, in some fields at least, to recover some additional oil; but in no case, so far as I am aware, has the additional oil so recovered constituted more than a very small proportion of that estimated to remain in the sands.

According to the present invention I am able to make relatively high recoveries of the oil in a sand either before or after the above mentioned treatments, in an economical manner.

My invention contemplates broadly the use, for displacing the oil toward the points of final recovery, that is to say the operating well or wells, of certain liquids which are of the colloid-suspension or colloid-solution type, and are characterized by their ability to displace oil quickly from the grain surfaces; by such surface tension relations to the so displaced oil that the latter tends to move ahead of the advancing liquid rather than to mingle with it; and by freedom from any substantial tendency to form stable emulsions with the oil. My preferred liquids are moreover both chemically and physically stable under the conditions of use: that is to say, they do not undergo chemical change by reaction with the constituents of the sands; and the colloidally suspended or dissolved components are not removed, to any great extent, at least, by the filtering effect of the bed. To ensure this physical stability I have found it necessary that the colloid suspensions (or colloid solutions, as they are sometimes termed) should be of a highly dispersed type. It should be understood, however, that my invention is not restricted to the use of colloidal suspensions containing particles within any particular dimension limits, since considerable variation is permissible according to the nature of the particular sand, or other gangue material as mentioned below, its grain size, the closeness of packing, etc. An example of a liquid which is neither physically nor chemically stable is an ordinary soap solution which tends to lose its soap content by filtration, on the one hand, and to clog the sand bed by chemical reactions yielding insoluble metallic soaps, on the other hand. Such ordinary soap solutions are moreover without substantial effect on the interfacial tension between the oil and the displacing liquid.

Among the materials which are suitable for use in my invention are colloidal suspensions of sulfonated organic substances which will not form insoluble substances in contact with soluble lime and magnesium salts. Such, for example, are certain sulfonated vegetable and animal oils and some of their salts, as well as a number of sulfonated hydrocarbons, both aliphatic and aromatic; also mixtures of these materials. Certain of the products obtained by sulfonating animal or vegetable oils in the presence of hydrocarbons also give excellent results.

A preferred material for my purpose is obtained from the acid sludge from the sulfuric acid treatment of petroleum or coal tar products, which is desirable not only by reason of its effectiveness for the purposes of this invention, but because of its low cost and ready availability. All of the above may, in general, be employed in acid, neutral or alkaline suspension, and in the form of their alkali or alkali earth salts, and in admixture with other materials.

The essential characteristics of the substances which I contemplate using in my invention are that they are highly dispersed colloidal substances and that they do not form a precipitate in the presence of lime and magnesium salts. The suitability of a given colloidal material for use in my process of recovering oil from oil sands may readily be determined, as far as the latter of the above characteristics is concerned, by means of the following simple test:

The material to be used is dissolved in water, preferably the water which will be used in making the solutions in the field, that is, the surface water of the region. This solution is then mixed with an equal volume of "oil well water", that is, water which has been in contact with the oil sands of the field for some time. The mixture is allowed to stand at room temperature for several weeks.

When common soap or ordinary Turkey red oil or similar materials in one-half of one percent solution is subjected to the above test, a precipitate is soon formed. This precipitate may be granular, flocculent or gummy, and may precipitate instantly or only on standing for a number of days, but the appearance of any precipitate is an indication that the material is unsuitable for the purposes of the invention.

On the other hand, a sulfonated hydrocarbon may be obtained from acid sludge, as I have described above, which will not give any precipitate in this test. While any other method of determining whether a given material will form an insoluble substance in the presence of lime and magnesium salts may be used, it will be noted that the test outlined above affords a simple and direct method of testing the proposed materials under conditions resembling those under which they are to be used.

As between acid, neutral or alkaline suspensions, my present preference is in favor of very slight alkalinity, especially for use with such sands as are closely packed or contain small amounts of calcium or magnesium compounds. Such slightly alkaline suspensions show a high stability, both physical and chemical; their physical stability being attributable to their somewhat higher dispersion, and their chemical stability to their non-reactivity. Acid suspensions undergo neutralization and eventually may become alkaline in passing through these sands, while more strongly alkaline suspensions tend to lose alkalinity, possibly by adsorption.

My invention is not limited by theoretical considerations, which are, of course, difficult or impossible of proof by reason of the inaccessibility of the beds, except in the form of drill cores. The following explanatory considerations are therefore offered as clarifying the invention without limitation of its scope.

A depleted sand bed may be regarded as comprising a more or less close-packed sand, the grain surfaces of which are covered by adherent oil films, and the interstitial cavities filled with gas. Pumping may remove a part of the gas, but is ineffective to cause any substantial movement of the oil films. Air does not operate to lift or displace the oil films, but may cause some movement of oil by dissolving therein under pressure and causing frothing when the pressure is released. Water likewise fails to displace the adherent films, at least to any great extent, since its surface tension, as compared with oil, is such that the latter "wets" or adheres to the grain surfaces more strongly than does water; and the same is true of weak acid or alkaline solutions, such for example as solutions of sodium carbonate, silicate, borate or the like. Such additional oil recoveries as are obtainable with water or aqueous alkaline solutions are attributable in the main to the displacement of some remaining interstitial oil as distinguished from the adsorbed or film oil. As distinguished from these, my highly dispersed colloid suspensions possess the property of quickly displacing or lifting the film oil, owing to their superior wetting power for the sand grains; moreover these suspensions tend strongly, as compared with water or aqueous solutions, to drive the oil ahead of the moving body of aqueous liquid, instead of slipping past the oil particles and commingling with them, with the result that the ratio of oil to aqueous liquid in the recovered product is decidedly higher in the case of the colloidal suspensions. Furthermore, as already stated, the colloidal suspensions exhibit no tendency to the formation of emulsions; as a matter of fact, these suspensions are effective to break down existing "water-in-oil" emulsions, even those of a highly stable and refractory type.

I do not limit myself to any particular proportion or range of proportions of colloid to water in my suspensions, since of course such concentration will be chosen as is most economical in any particular field, having regard to the cost of materials and the recoveries obtained. Proportions of sulfonated hydrocarbon as low as .02% show some effect, and proportions as high as 1.00% or 2% may be used. My usual practice has been to employ about 0.10 to 0.50% of the sulfonated body, but as stated my invention is not restricted to this range.

I believe myself to be the first to employ highly dispersed colloids which are both physically and chemically stable in presence of oil sands for the purpose of aiding the recovery of oil from oil sands, the expression "highly dispersed" being employed in a general and broad sense to indicate that the degree of dispersion of the colloid particles is sufficiently high so that serious or material losses are not encountered through the filtering effect of the particular oil sand in connection with which they are used.

The term "sulfonate" is used broadly to include such sulfonated oils or hydrocarbons as are above mentioned, or their salts or mixtures thereof, whether in acid, neutral or alkaline solution.

The term "oil sands" is used herein in its broad sense to include such other bitumen-gangue materials as are mentioned above.

This application is a continuation-in-part of my application Serial No. 53,442, filed August 29, 1925.

I claim:

1. Process of recovering oil from oil sands in situ which comprises flowing therethrough an aqueous liquid comprising a highly dispersed colloid materal which is physically and chemically stable in the presence of said sands.

2. Process of recovering oil from oil sands in situ which comprises flowing therethrough an aqueous liquid comprising a highly dispersed colloid material including a sulfonate which is physically and chemically stable in the presence of said sands.

3. Process of recovering oil from oil sands in situ which comprises flowing therethrough an aqueous liquid comprising a highly dispersed colloid material including a hydrocarbon sulfonate which is physically and chemically stable in the presence of said sands.

4. Process of recovering oil from oil sands in situ which comprises flowing therethrough an aqueous liquid comprising a highly dispersed colloid materal which will not form a precipitate when mixed with water that has been in contact with said sands.

5. Process of recovering oil from oil sands in situ which comprises flowing therethrough an aqueous liquid comprising a highly dispersed colloid material including a sulfonate which will not form a precipitate when mixed with water that has been in contact with said sands.

6. Process of recovering oil from oil sands in situ which comprises flowing therethrough an aqueous liquid comprising a highly dispersed colloid materal including a hydrocarbon sulfonate which will not form a precipitate when mixed with water that has been in contact with said sands.

In testimony whereof, I affix my signature.

GEORGE W. COGGESHALL.